Jan. 4, 1966 P. S. HEILER 3,226,756
CONCEALED WINDSHIELD WIPER MECHANISM
Filed Aug. 3, 1964 3 Sheets-Sheet 1
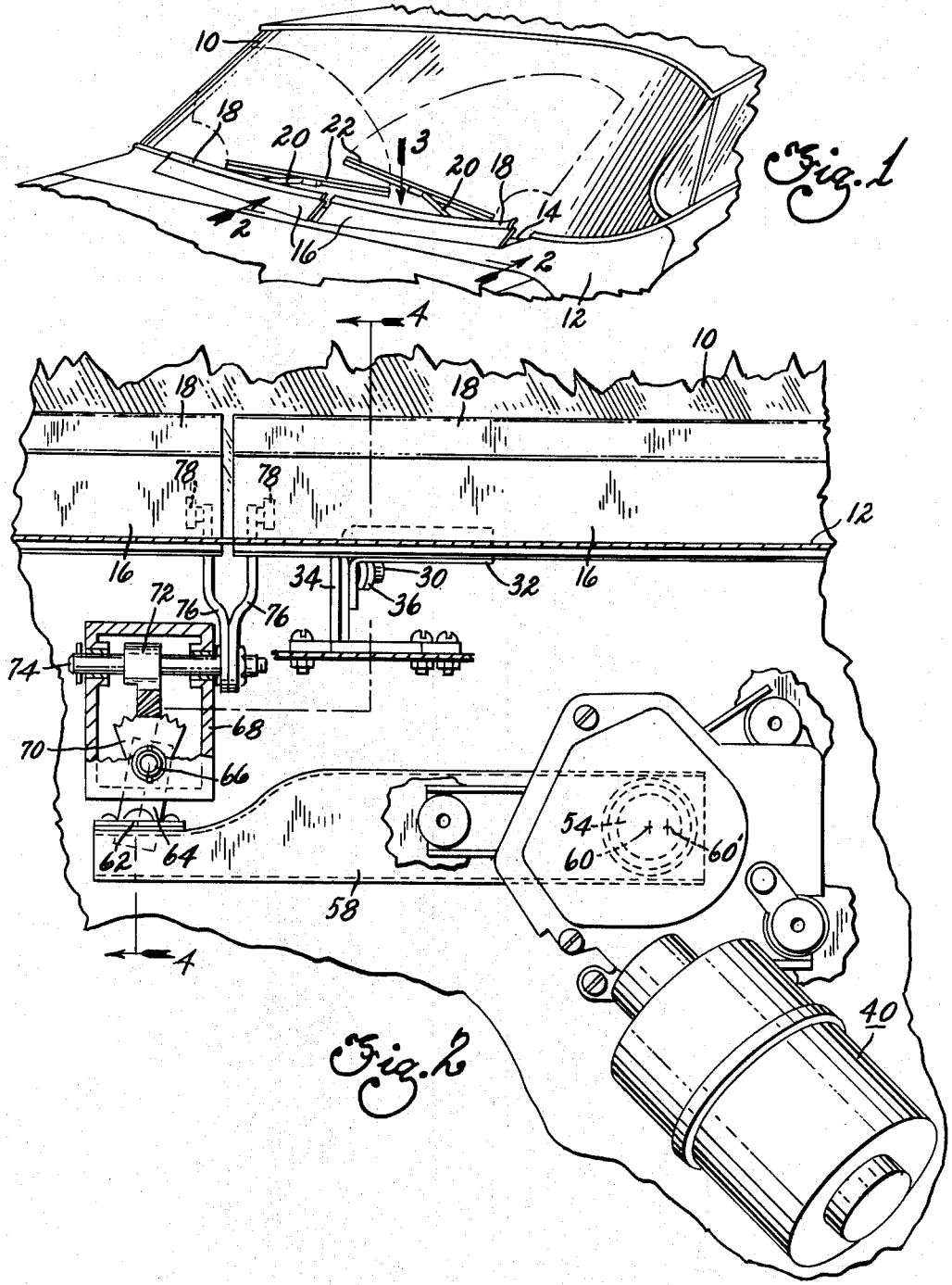
INVENTOR
PAUL S. HEILER
BY W.E. Finkel
HIS ATTORNEY

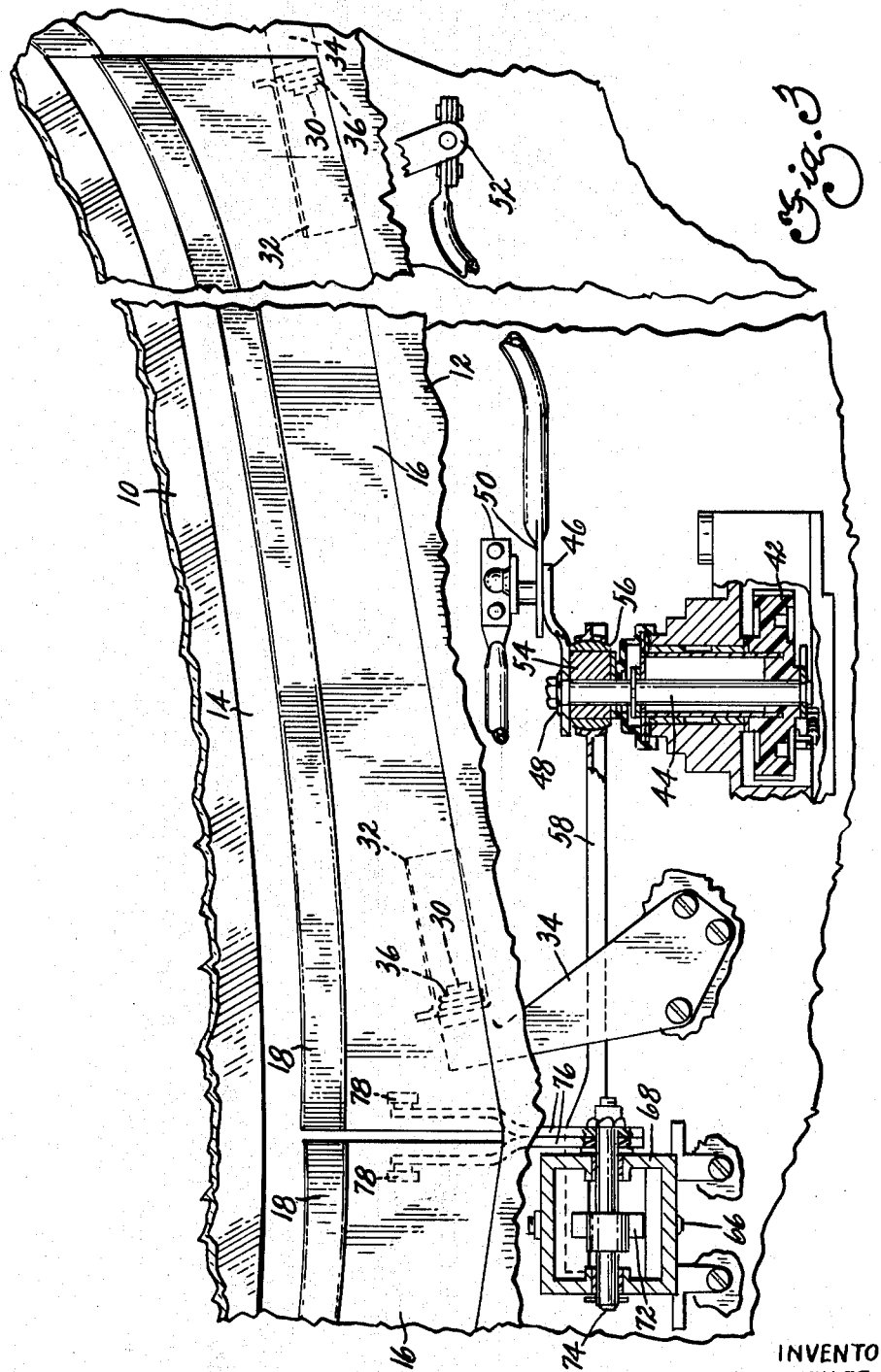

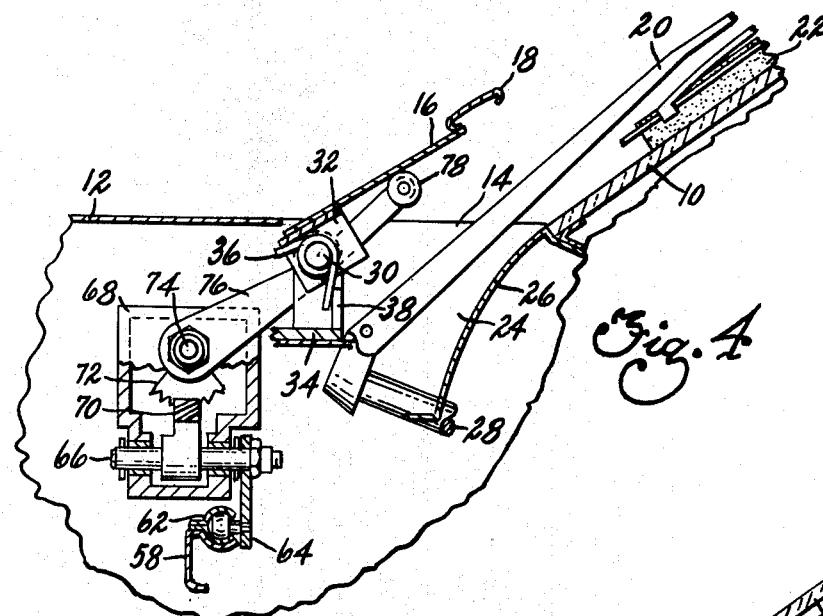
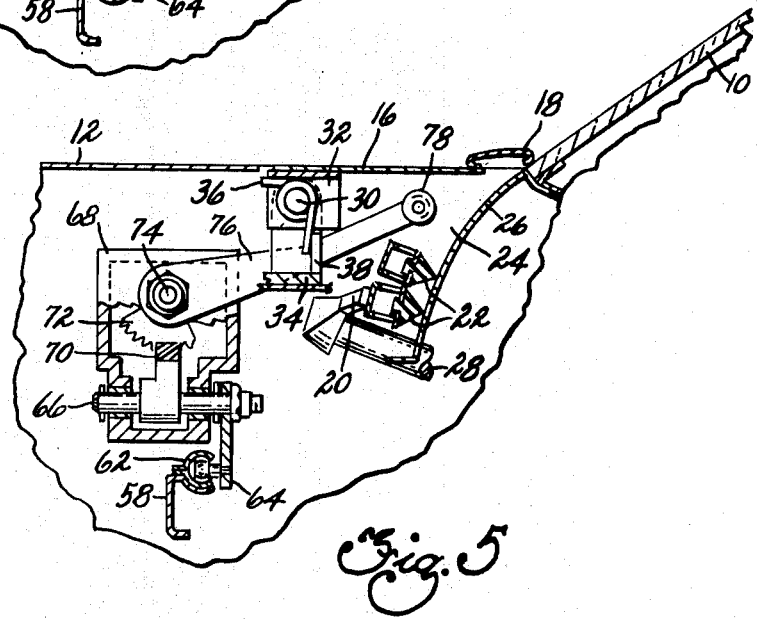

United States Patent Office 3,226,756
Patented Jan. 4, 1966

3,226,756
CONCEALED WINDSHIELD WIPER
MECHANISM
Paul S. Heiler, Fairport, N.Y., assignor to General Motors Corporation, Detroit, Mich., a corporation of Delaware
Filed Aug. 3, 1964, Ser. No. 386,917
10 Claims. (Cl. 15—250.19)

This invention pertains to windshield cleaning mechanism, and particularly to an improved wiper mechanism for vehicular windshields which is concealed when not in use.

In my earlier application Serial No. 364,456 filed May 4, 1964, a concealed windshield wiper mechanism is disclosed wherein the wiper arm and blade assemblies are disposed in a well located forwardly of the windshield when not in use, and wherein the well is closed by cover means that are automatically actuated by the wiper drive linkage during movement of the wiper arm and blade assemblies between their operating and stowed positions. The present invention relates to an improved mechanism of the aforesaid type wherein the cover means are drivingly connected to, and automatically actuated by variation in the throw of the crank assembly for moving the wiper blade and arm assemblies between their operating and stowed, or parked, positions.

Accordingly, among my objects are the provision of concealed windshield wiper mechanism including automatically operated cover means actuated by the wiper motor; the further provision of concealed windshield wiper mechanism including linkage means actuated by the wiper motor for automatically coordinating movement of the cover means between open and closed positions with movement of the wiper mechanism between its parked and operating positions; and the still further provision of concealed windshield wiper mechanism of the aforesaid type including two-part cover means which are spring biased to the closed position and mechanically actuated to an open position by wiper motor driven means.

The aforementioned and other objects are accomplished in the present invention by establishing a driving connection between the linkage means for opening the cover means only during movement of the wiper blade and arm assemblies between their stowed and operating positions. In the disclosed embodiment this is achieved by incorporating an eccentric in the variable throw crank mechanism such that during running operation of the wiper motor the eccentric idles whereas during parking operation of the wiper motor the eccentric actuates the cover linkage to open the cover means when the wiper blades and arms are moved out of their parked positions and permits the spring means to close the cover means when the wiper arm and blade assemblies are moved to their parked positions.

Further objects and advantages of the present invention will be apparent from the following description, reference being had to the accompanying drawings, wherein a preferred embodiment of the present invention is clearly shown, and wherein similar numerals depict similar parts throughout the several views.

FIGURE 1 is a fragmentary perspective view of a vehicle equipped with the mechanism of the present invention.

FIGURE 2 is an enlarged view, partly in section and partly in elevation, taken along line 2—2 of FIGURE 1.

FIGURE 3 is a fragmentary view with certain parts broken away, partly in section and partly in elevation, taken in the direction of arrow 3 in FIGURE 1.

FIGURE 4 is a fragmentary view, partly in section and partly in elevation, taken along line 4—4 of FIGURE 2 with the wiper mechanism in its operating position.

FIGURE 5 is a view similar to FIGURE 4 with the wiper mechanism in its stowed, or parked, position.

Referring to FIGURE 1, a vehicle is shown having a windshield 10 with a forwardly extending cowl 12 having an opening 14 formed therein adapted to be closed by a pair of hinged covers 16 which carry portions 18 of the lower reveal molding. The opening 14 in the cowl portion provides access to a well disposed forwardly and beneath the windshield into which wiper arms 20 carrying blades 22 are stowed when not in use. As is apparent from FIGURE 1, the wiper blades 22 are movable in phase opposition across the outer surface of the windshield throughout paths that overlap in the central portion of the windshield.

Referring to FIGURES 4 and 5, the well 24 has a curved ramp 26 constituting a rear wall thereof to provide a surface for supporting the wiper blades during movement to and from their stowed, or parked, positions. The wiper mechanism utilizes conventional wiper arms 20 having spring hinge connected inner and outer sections, the inner sections of which are drivingly connected to pivot shafts 28 suitably journalled in brackets, not shown, attached to the vehicle. The covers 16 are hinged along their forward edge by hinge pins 30. To this end, hinge pins 30 extend through brackets 32 attached to the cover and brackets 34 attached to the vehicle body wall structure. Moreover, as seen in FIGURES 4 and 5, the hinge pins 30 are encircled by torsion springs 36, one end of which engages the cover and the other end of which engages a flange 38 on the bracket such that torsion springs 36 bias the covers 16 to the closed position as shown in FIGURE 5.

Referring to FIGURES 2 and 3, the wiper blade and arm assemblies are oscillated by a drive mechanism comprising a unidirectional electric motor 40 (FIGURE 2) which is coupled to a worm wheel (FIGURE 3) of a variable throw crank assembly which may be of the type disclosed in Patent No. 2,985,024. Thus, the variable throw crank assembly includes a drive shaft 44 eccentrically journalled in the worm wheel 42 and having an interruptible driving connection therewith such that during normal running operation of the motor 40, the drive shaft 44 rotates with the worm wheel 42 in an orbital path about the axis of the worm wheel. During parking operation of the drive mechanism, rotation of the shaft 44 is arrested and continued rotation of the worm wheel 44 will shift the axis thereof and thereby increase the throw of the crank mechanism which includes a crank arm 46 attached to the outer end of the drive shaft 44 by a nut and lock washer assembly 48. The outer end of the crank arm 46 is connected to the inner end of drive links 50. As seen in FIGURE 3, one of the drive links 50 is connected to crank arm 52 adjacent its outer end for actuating one of the pivot shafts. The other drive link 50 is connected through a suitable reversing mechanism to the other pivot shaft in a manner shown in the aforementioned Patent No. 2,985,024.

Since the drive shaft 44 rotates in an orbital path around the axis of the worm wheel 42 during running operation of the drive mechanism, whereas its axis is shifted during parking movement, this variation in the position of the drive shaft 44 can be utilized to actuate the cover members during movement of the wiper blade and arm assemblies to and from their parked positions. To this end, an eccentric 54 is attached to the drive shaft 44 and supports a spherical bearing 56 which receives one end of a link 58. The axis of the eccentric 54 is coincident with the axis of the worm wheel 42 and hence during normal running movement of the wiper mechanism no transverse movement will be imparted to the link 58 since the eccentric 54 merely idles, i.e., rotates about its axis which is coincident with the axis of the worm wheel 42. However, when the axis of the drive shaft 44 is shifted during parking movement of the wiper blade and arm assemblies, the eccentric 54 will likewise be shifted so as to impart movement to the drive link 58 to the right as seen in FIGURES 2 and 3. More particularly, the crank 60 of the eccentric 54 will be shifted to 60′ as seen in FIGURE 2 when the blades and arms are moved from their operating position on the windshield to their parked position within the well.

The other end of the link 58 is connected through a ball and socket joint 62 to a crank arm 64. As seen more particularly in FIGURES 4 and 5, the crank arm 64 is connected to a shaft 66 journalled in a housing 68 and having a 45° helical sector gear 70 attached thereto. The helical sector gear 70 meshes with a second 45° helical sector gear 72 attached to a second shaft 74 journalled in the housing 68. The shaft 74 has a pair of cover drive arms 76 attached to its outer end carrying rollers 78 adapted to engage the lower surface of the covers 16 so as to impart pivotal movement thereto from their closed position to their open position. As seen in FIGURE 5, when the covers are fully closed, the rollers 78 are spaced from the lower surface thereof so that the arms 76 are accelerated by the cover actuating linkage such that the impact between the rollers and the cover will be sufficient to break the covers loose if their movement is restricted by ice or snow.

When the wiper mechanism is not in use, it is, of course, concealed within the well by the cover 16. Upon energization of the wiper motor 40 to move the wiper blades from their parked positions to their operating positions, the cover drive linkage is conjointly actuated to move the covers 16 to their open position as seen in FIGURE 4. During the running cycle of the wiper blades across the outer surface of the windshield between their normal running stroke end limits, the cover members 16 are held in their open position by the drive links 76. However, when operation of the wiper mechanism is discontinued whereby the wiper blades and arms are moved to their parked positions within the well, the drive arms 76 are withdrawn to the position of FIGURE 5 thereby permitting the torsion springs 36 to close the cover members 16.

While the invention as herein disclosed constitutes a preferred form, it is to be understood that other forms might be adopted.

What is claimed is as follows:

1. Windshield cleaning mechanism for a vehicle having a windshield, a cowl with a transversely extending well having an access opening and hinged cover means for closing the access opening, including, a pair of spaced oscillatable cleaner assemblies, means including a variable throw crank operable to impart conjoint oscillation to said cleaner assemblies across the outer surface of said windshield and to move said cleaner assemblies to parked positions whereat said cleaner assemblies are disposed within said well, and cover operating linkage means drivingly connected to, and automatically actuated upon variation in the throw of said crank during movement of said cleaner assemblies between their parked and operating positions for opening said cover means and maintaining said cover means in an open position.

2. Windshield cleaning mechanism for a vehicle having a windshield, a cowl with a transversely extending well therein having an access opening and hinged cover means for closing the access opening, including, a pair of spaced oscillatable cleaner assemblies, means including a variable throw crank operable to impart conjoint oscillation to said cleaner assemblies across the outer surface of said windshield and to move said cleaner assemblies to and from said well, cover operating linkage means drivingly connected to, and automatically actuated upon variation in the throw of said crank during movement of said cleaner assemblies from said well for moving said cover means to an open position and maintaining the cover means thereat when the cleaner assemblies are in their operating position, and spring means operable to move said cover means to a closed position when the cleaner assemblies are disposed within said well.

3. Windshield cleaning mechanism for a vehicle having a windshield, a cowl with a transversely extending well having an access opening and hinged cover means to close the access opening, including, a pair of spaced oscillatable cleaner assemblies, a motor, a variable throw rotary crank assembly driven by said motor, linkage means connected to said crank assembly for imparting conjoint oscillation to said cleaner assemblies across the outer surface of said windshield, said cleaner assemblies being movable to and from said well upon variation in the throw of said crank asembly, and cover operating means drivingly connected to and automatically actuated upon variation in the throw of said crank assembly for opening and maintaining said cover means in an open position when the cleaner assemblies are moved to their operating position on said windshield and permitting closure of said cover means when said cleaner assemblies are in said well.

4. Windshield cleaning mechanism for a vehicle having a windshield, a cowl with a transversely extending well having an access opening and hinged cover means to close the access opening, including, a pair of spaced oscillatable cleaner assemblies, a motor, a variable throw rotary crank assembly driven by said motor, linkage means connected to said crank assembly for imparting conjoint oscillation to said cleaner assemblies across the outer surface of said windshield, said cleaner assemblies being movable to and from said well upon variation in the throw of said crank assembly, cover operating means drivingly connected to and automatically actuated upon variation in the throw of said crank assembly for moving said cover means to an open position when the cleaner assemblies are moved to their operating position on said windshield, and spring means operable to move said cover means to a closed position when the cleaner assemblies are disposed within said well.

5. Windshield cleaning mechanism for a vehicle having a windshield, a cowl with a transversely extending well having an access opening and hinged cover means to close the access opening, including, a pair of spaced oscillatable cleaner assemblies, a motor, a variable throw rotary crank assembly driven by said motor, linkage means connected to said crank assembly for imparting conjoint oscillation to said cleaner assemblies across the outer surface of said windshield, said variable throw crank assembly including a driving gear and a shaft having an interruptible driving connection therewith, the axis of the shaft being eccentric to the axis of the driving gear, said shaft being rotatable with said driving gear in an orbital path around the axis of said driving gear so as to impart oscillation to said cleaner assemblies throughout a running stroke and movable relative to said driving gear to effect a variation in the throw of said crank assembly and move said cleaner assemblies to and from said well, and cover operating means drivingly connected to and automatically actuated upon relative movement between said shaft and said driving gear for automatically opening said cover means when the cleaner assemblies are moved out of the well.

6. The windshield cleaning mechanism set forth in claim 5 including spring means constantly acting on said cover means for biasing said cover means to a closed position.

7. The combination set forth in claim 5 including an eccentric attached to said shaft and rotatable therewith, the axis of said eccentric being coincident with the axis of said driving gear, and wherein said cover actuating means is drivingly connected with said eccentric.

8. The combination set forth in claim 7 wherein said cover actuating means comprises a link having one end operatively journalled on said eccentric and the other end operatively connected to said cover means.

9. The combination set forth in claim 8 wherein the operative connection between the other end of said link and said cover means comprises a pair of crank shafts having their axes located in planes normal to each other, and helical gear means interconnecting said crank shafts.

10. The combination set forth in claim 9 wherein one of said crank shafts has a pair of drive arms attached thereto enagageable with said cover means, and wherein said drive arms are normally disengaged from said cover means when the cover means are in the closed position whereby opening movement of said cover means will be caused by impact between said drive arms and said cover means upon variation in the throw of said crank assembly.

References Cited by the Examiner
UNITED STATES PATENTS

| | | | |
|---|---|---|---|
| 2,895,157 | 7/1959 | Kocourek | 15—250.19 |
| 2,936,477 | 5/1960 | Feller | 15—250.19 |
| 3,120,673 | 2/1964 | Buckwald | 15—250.17 |
| 3,121,902 | 2/1964 | Massoll | 15—250.17 |

FOREIGN PATENTS 721,465  1/1955  Great Britain.

CHARLES A. WILLMUTH, *Primary Examiner.*